(12) United States Patent
Chen et al.

(10) Patent No.: US 10,721,799 B2
(45) Date of Patent: Jul. 21, 2020

(54) LED DRIVING DEVICE, CONSTANT-POWER DIMMING CIRCUIT AND DIMMING METHOD THEREOF

(71) Applicant: SHENZHEN SENDIS SEMICONDUCTOR CO., LTD, Shenzhen (CN)

(72) Inventors: Xiaoyu Chen, Shenzhen (CN); Xunsheng Deng, Shenzhen (CN); Bo Chen, Shenzhen (CN); Yanquan Mai, Shenzhen (CN)

(73) Assignee: SHENZHEN SENDIS SEMICONDUCTOR CO., LTD., Shenzhen (CN)

( * ) Notice: Subject to any disclaimer, the term of this patent is extended or adjusted under 35 U.S.C. 154(b) by 0 days.

(21) Appl. No.: 16/615,129

(22) PCT Filed: May 9, 2018

(86) PCT No.: PCT/CN2018/086102
§ 371 (c)(1),
(2) Date: Nov. 19, 2019

(87) PCT Pub. No.: WO2018/210166
PCT Pub. Date: Nov. 22, 2018

(65) Prior Publication Data
US 2020/0128645 A1    Apr. 23, 2020

(30) Foreign Application Priority Data

May 19, 2017    (CN) .......................... 2017 1 0357761

(51) Int. Cl.
*H05B 45/10*    (2020.01)
*H05B 45/3725*    (2020.01)
(Continued)

(52) U.S. Cl.
CPC .......... *H05B 45/10* (2020.01); *H05B 45/325* (2020.01); *H05B 45/345* (2020.01); *H05B 45/3725* (2020.01); *H05B 45/40* (2020.01)

(58) Field of Classification Search
CPC ...... H05B 45/00; H05B 45/10; H05B 45/325; H05B 45/345; H05B 45/3725; H05B 45/40; H05B 47/00; H05B 47/10
See application file for complete search history.

(56) References Cited

U.S. PATENT DOCUMENTS 9,125,273 B2    9/2015 Jung et al.
2012/0098454 A1*    4/2012 Grotkowski ........... H05B 45/10
315/246

FOREIGN PATENT DOCUMENTS

CN    103108470 A    5/2013
CN    103607810 A    2/2014
(Continued)

OTHER PUBLICATIONS

World Intellectual Property Organization (WIPO) International Search Report for PCT/CN2018/086102 dated Aug. 21, 2018 7 pages.

*Primary Examiner* — Jimmy T Vu
(74) *Attorney, Agent, or Firm* — Anova Law Group, PLLC (57) ABSTRACT

An LED driving device and a constant power dimming circuit and dimming method therefor. The constant power dimming circuit comprises a line voltage compensation module, a modulation module, a filtering module, and a constant current source module. The line voltage compensation module detects changes in line voltage and outputs a first reference voltage. The modulation module modulates the first reference voltage and outputs to the filtering module a second reference voltage. The filtering module filters the second reference voltage signal and then outputs a third reference voltage to the constant current source module. The
(Continued)

constant current source module outputs constant current to drive an LED load to operate. By controlling a constant current source circuit, when the duty cycle of the PWM signal is not changed but a mains input voltage is changed, the input power of the system can be maintained constant, and voltage flicker is reduced.

10 Claims, 6 Drawing Sheets

(51) Int. Cl.
*H05B 45/40* (2020.01)
*H05B 45/345* (2020.01)
*H05B 45/325* (2020.01)

(56) References Cited

FOREIGN PATENT DOCUMENTS

| | | |
|---|---|---|
| CN | 203801121 U | 8/2014 |
| CN | 105657903 A | 6/2016 |
| CN | 107071982 A | 8/2017 |
| CN | 206775787 U | 12/2017 |

* cited by examiner

LED DRIVING DEVICE, CONSTANT-POWER DIMMING CIRCUIT AND DIMMING METHOD THEREOF

CROSS-REFERENCES TO RELATED APPLICATIONS

This application is a national stage application of PCT Patent Application No. PCT/CN 2018/086102, filed on May 9, 2018, which claims priority to Chinese Patent Application No. 201710357761.6, filed on May 19, 2017, the content of all of which is incorporated herein by reference.

FIELD OF THE DISCLOSURE

The disclosure relates to the technical field of LED illumination, in particular to an LED driving device, a constant-power dimming circuit and a dimming method therefor.

BACKGROUND

Figure 1:
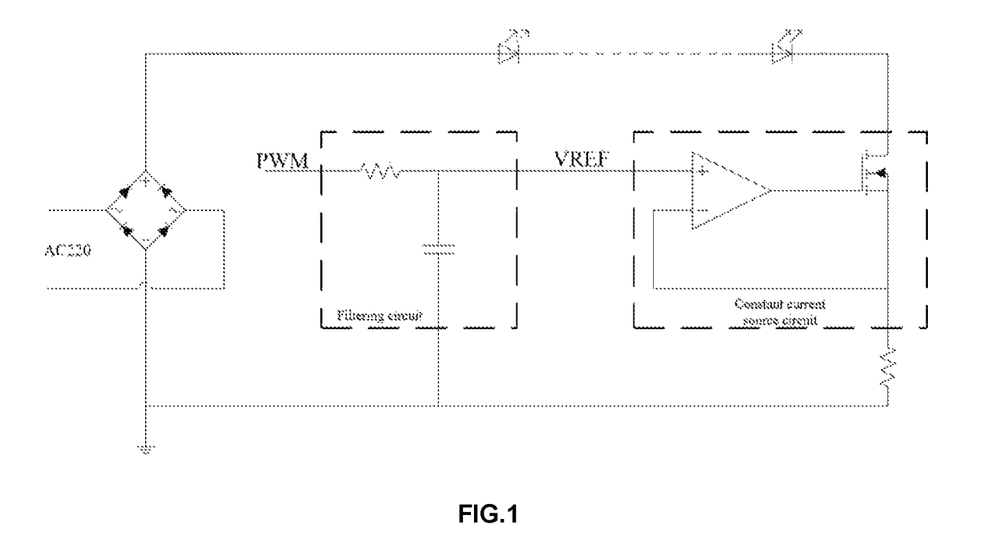
FIG. 1 is a circuit diagram of a prior art LED dimmer.
Figure 2:
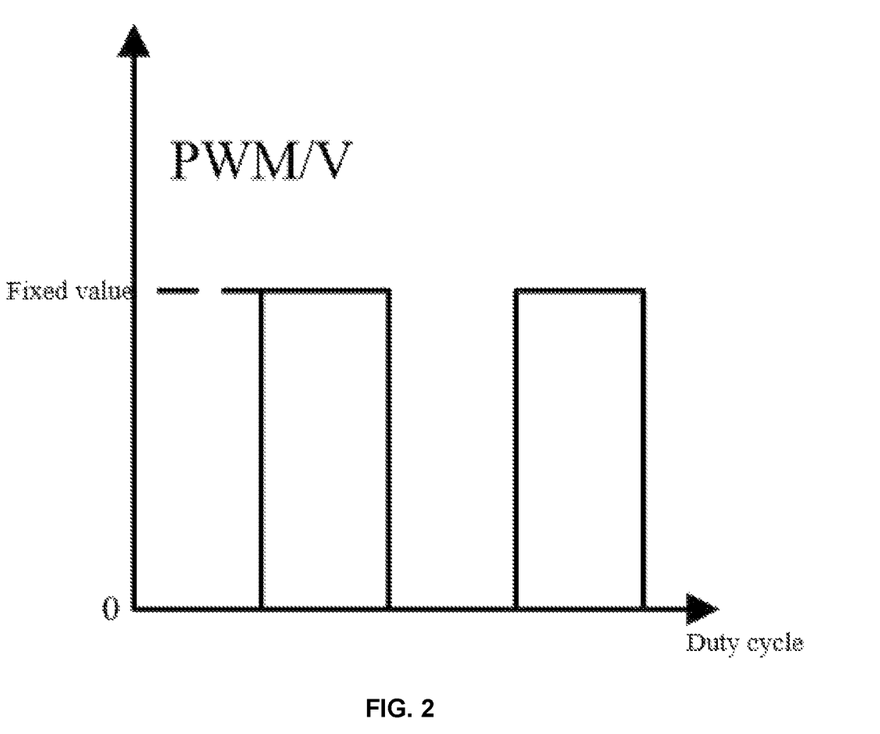
FIG. 2 is a schematic diagram of a constant duty cycle of a PWM signal.
Figure 3:
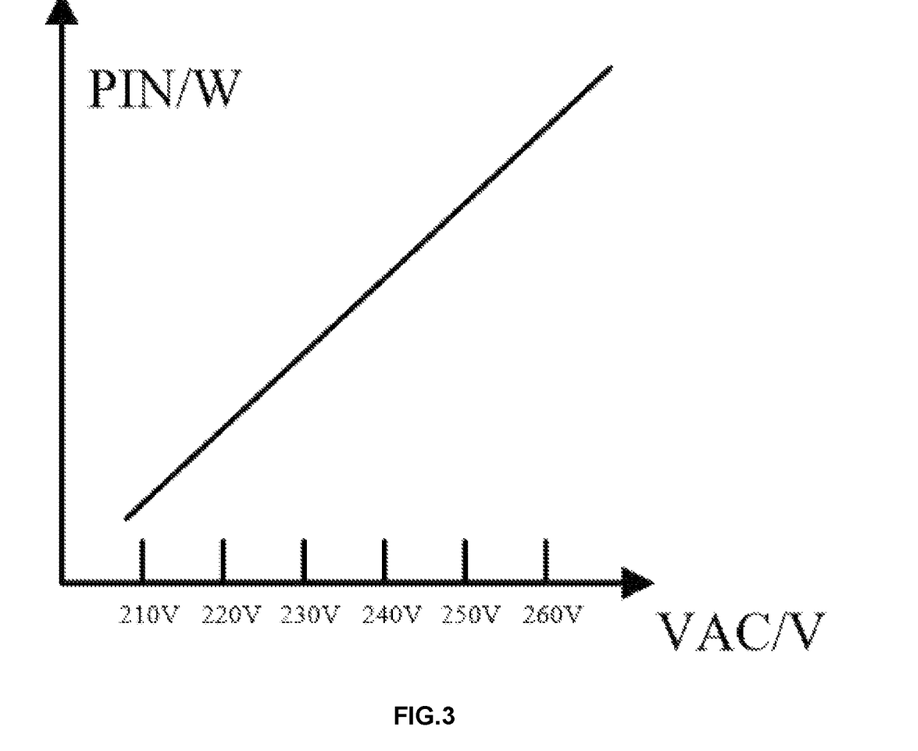
FIG. 3 is a graph of system input power versus input mains supply.

The traditional PWM dimming method driven by the linear constant-current LED comprises the following steps: as shown in FIG. 1, an input PWM signal is converted into a DC reference voltage VREF through an RC filtering circuit, and the output current of the constant current source circuit is changed according to the DC reference voltage VREF so as to realize dimming. However, as shown in FIGS. 2 and 3, according to such manner of dimming, when the duty cycle of the PWM signal is constant, the input power of the linear constant-current LED driving system is changed when the input mains supply voltage is changed, thereby causing voltage flicker and affecting the overall lighting effect.

Accordingly, the prior art has yet to be improved.

BRIEF SUMMARY OF THE DISCLOSURE

In view of the defects of the prior art, the disclosure aims to provide an LED driving device, a constant-power dimming circuit and a dimming method therefor, wherein a constant-current source circuit is controlled by outputting voltage with line voltage compensation information and PWM signal duty cycle information at the same time, so that when the duty cycle of the PWM signal is unchanged and the input mains supply voltage is changed, the input power of the system is kept constant, and voltage flicker is reduced.

In order to achieve the purpose, the disclosure adopts the following technical scheme:

A constant-power dimming circuit of an LED driving device, which comprises a line voltage compensation module, a modulation module, a filtering module and a constant current source module, a change of a line voltage is detected by the line voltage compensation module, and a first reference voltage having compensation information is output according to a present line voltage; the first reference voltage is modulated by the modulation module according to an externally input PWM signal to output a second reference voltage having compensation information and PWM duty cycle information is output to the filtering module; a third reference voltage is output to the constant current source module after the second reference voltage is filtered by the filtering module, and the constant current source module is controlled to output a constant current to drive an LED load to work.

According to the constant-power dimming circuit of the LED driving device, the line voltage compensation module is particularly used for outputting the first reference voltage changing according to a preset rule when the present line voltage is less than or equal to a threshold voltage; and outputting the first reference voltage having compensation information according to a value of the line voltage when the present line voltage is greater than the threshold voltage.

According to the constant-power dimming circuit of the LED driving device, the modulation module is particularly used for modulating the first reference voltage according to the externally input PWM signal to output the second reference voltage, so that a duty cycle of the second reference voltage is the same as that of the PWM signal, and an amplitude of the second reference voltage is the same as that of the first reference voltage.

According to the constant-power dimming circuit of the LED driving device, the line voltage compensation module comprises a current source, a voltage source, a conversion unit, a first current mirror unit, a second current mirror unit and a voltage dividing unit, an input line voltage is converted into a first current through the conversion unit and then output to the first current mirror unit for a first preset multiple mirror image processing to obtain a second current; a fourth current obtained from subtraction carried out on the second current and a third current output by the current source is output to the second current mirror unit for a second preset multiple mirror image processing to obtain a fifth current; and a reference voltage is output from the voltage source to the voltage dividing unit; and a magnitude of the first reference voltage output following a division of the reference voltage by the voltage dividing unit is controlled according to the fifth current to obtain the first reference voltage having compensation information.

According to the constant-power dimming circuit of the LED driving device, the modulation module comprises a signal receiving unit and a modulation unit, the externally input PWM signal is received by the signal receiving unit, followed by level shift processing, and then output to the modulation unit; the first reference voltage is modulated by the modulation unit according to the PWM signal processed through level shift to output the second reference voltage, so that a duty cycle of the second reference voltage is the same as that of the PWM signal, and an amplitude of the second reference voltage is the same as that of the first reference voltage.

According to the constant-power dimming circuit of the LED driving device, the conversion unit comprises a conversion resistor, and the first current mirror unit comprises a first MOS transistor, a second MOS transistor, a third MOS transistor, a fourth MOS transistor, a fifth MOS transistor, a sixth MOS transistor, a seventh MOS transistor and an eighth MOS transistor; one end of the conversion resistor is connected with a line voltage output end, and the other end of the conversion resistor is connected with a drain electrode of the first MOS transistor, a gate electrode of the first MOS transistor and a gate electrode of the second MOS transistor; a source electrode of the first MOS transistor is grounded, and a substrate of the first MOS transistor is connected with a drain electrode of the third MOS transistor, a gate electrode of the third MOS transistor and a gate electrode of the fourth MOS transistor; a drain electrode of the second MOS transistor is connected with a drain electrode of the seventh MOS transistor, a gate electrode of the seventh MOS transistor and a gate electrode of the eighth MOS transistor; a source electrode of the second MOS transistor is grounded, and a substrate of the second MOS transistor is connected with a drain electrode of the fourth MOS transistor; a source electrode and a substrate of the third MOS transistor are both grounded; a source electrode and a substrate of the fourth MOS transistor are both grounded, a source electrode and a substrate of the fifth MOS transistor are connected with a VDD power supply end, and a gate electrode of the fifth MOS transistor is connected with a drain electrode of the fifth MOS transistor, a gate electrode of the sixth MOS transistor and a substrate of the seventh MOS transistor; a source electrode and a substrate of the sixth MOS transistor are connected with the VDD power supply end; and a drain electrode of the sixth MOS transistor is connected with a substrate of the eighth MOS transistor; a source electrode of the seventh MOS transistor is connected with the VDD power supply end, a source electrode of the eighth MOS transistor is connected with the VDD power supply end; a drain electrode of the eighth MOS transistor is connected with one end of the current source and the second current mirror unit, and the other end of the current source is grounded.

According to the constant-power dimming circuit of the LED driving device, the second current mirror unit comprises a ninth MOS transistor and a tenth MOS transistor, wherein a drain electrode of the ninth MOS transistor is connected with the drain electrode of the eighth MOS transistor, a gate electrode of the ninth MOS transistor and a gate electrode of the tenth MOS transistor; and a source electrode and a substrate of the ninth MOS transistor are grounded; a drain electrode of the tenth MOS transistor is connected with the voltage dividing unit, and a source electrode and a substrate of the tenth MOS transistor are both grounded.

According to the constant-power dimming circuit of the LED driving device, the voltage dividing unit comprises a first resistor, a second resistor and a first operational amplifier, one end of the first resistor is connected with a positive electrode of the voltage source, the other end of the first resistor is connected with the drain electrode of the tenth MOS transistor, an in-phase input end of the first operational amplifier and get grounded through the second resistor; an anti-phase input end of the first operational amplifier is connected with an output end of the first operational amplifier and the modulation module.

A constant-power dimming method of an LED driving device, which comprises the following steps of:

A. Detecting by a line voltage compensation module a change of line voltage, and outputting a first reference voltage having compensation information according to a present line voltage;

B. Modulating by a modulation module the first reference voltage according to an externally input PWM signal to output a second reference voltage having compensation information and PWM duty cycle information to a filtering module; and C. Filtering by the filtering module before outputting a third reference voltage to a constant current source module, and controlling the constant current source module to output constant current to drive an LED load to work.

An LED driving device, which comprises an LED lamp string, a rectifying module used for rectifying an input alternating current, and a sampling resistor for sampling a current of the LED lamp string, and a constant power dimming circuit described above, an input end of the rectifying module is connected with alternating current, an output end of the rectifying module is connected with the constant-power dimming circuit and the LED lamp string, and the constant-power dimming circuit is grounded through the sampling resistor.

Compared with the prior art, according to the LED driving device, the constant-power dimming circuit and the dimming method therefor disclosed in the present application, the constant-power dimming circuit of the LED driving device comprises a line voltage compensation module, a modulation module, a filtering module and a constant current source module; change of the line voltage is detected by the line voltage compensation module, and a first reference voltage having compensation information is output according to the present line voltage; the first reference voltage is modulated by the modulation module according to an externally input PWM signal to output a second reference voltage having compensation information and PWM duty cycle information to the filtering module; a third reference voltage is output to the constant current source module after the second reference voltage is filtered by the filtering module, and the constant current source module is controlled to output constant current to drive the LED load to work. The constant-current source circuit is controlled by outputting voltage with line voltage compensation information and PWM signal duty cycle information at the same time, so that when the duty cycle of the PWM signal is unchanged and the input mains supply voltage is changed, the input power of the system is kept constant, and voltage flicker is reduced.

DETAILED DESCRIPTION OF EMBODIMENTS

In view of the defects of voltage flicker and the like caused by instability of an input mains supply in the prior art, the disclosure aims to provide an LED driving device, a constant-power dimming circuit and a dimming method therefor, wherein the constant-current source circuit is controlled by outputting voltage with line voltage compensation information and PWM signal duty cycle information at the same time, so that when the duty cycle of the PWM signal is unchanged and the input mains supply voltage is changed, the input power of the system is kept constant, and voltage flicker is reduced.

To further clarify the objects, technical schemes and effects of the present disclosure, reference is made to the accompanying drawings which illustrate, by way of example, the present disclosure. It should be understood that the embodiments described herein are merely illustrative of the disclosure and are not intended to be limiting thereof.

Figure 4:
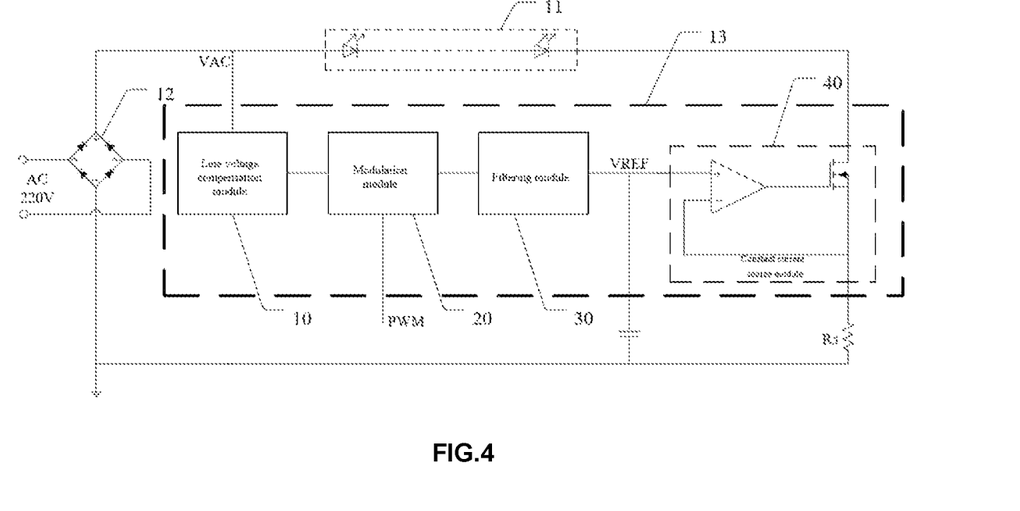
FIG. 4 is a schematic diagram of an LED driving device according to the present disclosure.

Referring to FIG. 4, the LED driving device provided by the disclosure comprises an LED lamp string 11, a rectifying module 12 for rectifying an input alternating current and a sampling resistor Rs for sampling the current of the LED lamp string 11, and a constant-power dimming circuit 13 for adjusting the current of the LED lamp string 11. The input end of the rectifying module 12 is connected with the alternating current and the output end of the rectification module 12 is connected with the constant-power dimming circuit 13 and the LED lamp string 11. The constant-power dimming circuit 13 is grounded through the sampling resistor Rs, the current of the LED lamp string 11 is controlled by the constant-power dimming circuit 13 according to a PWM signal to realize dimming. Meanwhile, when the duty cycle of the PWM signal is unchanged, the input power of the system is kept constant when the input mains supply voltage is changed, and voltage flicker is effectively reduced. In this embodiment, the rectifier module 12 is a rectifier bridge.

In particular, the constant-power dimming circuit 13 comprises a line voltage compensation module 10, a modulation module 20, a filtering module 30 and a constant current source module 40, wherein the line voltage compensation module 10 is connected with a line voltage output end VAC, the line voltage compensation module 10 is also connected with the filtering module 30 through the modulation module 20, the filtering module 30 is also connected with the constant current source module 40, the change of the line voltage is detected by the line voltage compensation module 10, and a first reference voltage having compensation information is output according to the amplitude of the present line voltage. The first reference voltage is modulated by the modulation module 20 according to an externally input PWM signal to output a second reference voltage having compensation information and PWM duty cycle information to the filtering module 30; a third reference voltage is output to the constant current source module 40 after that, and the constant current source module 40 is controlled to output constant current to drive the LED load to work.

According to the disclosure, the change of the line voltage is detected by the line voltage compensation module 10, the corresponding first reference voltage having compensation information is output according to the value of the line voltage, that is, the first reference voltage is a voltage signal of the line voltage subjected to compensation correction, and then the first reference voltage is modulated by the modulation module 20 according to the received PWM signal to synthesize the signal characteristics of the PWM signal and the signal characteristics of the first reference voltage; the second reference voltage having both the compensation information and the PWM duty cycle information is output to the filtering module 30, that is, the second reference voltage has both the characteristics of the PWM signal and the characteristics of the second reference voltage. The second reference voltage is filtered and converted by the filtering module 30 to output a direct-current third reference voltage, and the output current of the constant-current source module 40 is controlled according to the third reference voltage to drive the LED load to work. Due to the fact that the third reference voltage input to the constant current source module 40 also has the characteristics of the PWM signal and the second reference voltage, when dimming, the input power of the system changes linearly when the duty cycle of the PWM signal changes, and when the duty cycle of the PWM signal is the same, the change of the input mains supply voltage does not cause the linear change of the input power of the system which remains substantially constant, and the overall lighting effect is improved.

In particular, the line voltage compensation module 10 is particularly used for outputting a first reference voltage changing according to a preset rule when the present line voltage is less than or equal to the threshold voltage; outputting a first reference voltage having compensation information according to the value of the line voltage when the present line voltage is greater than the threshold voltage. That is, when the line voltage is smaller due to fluctuation of the mains supply voltage, a first reference voltage changing according to a preset rule is output by the line voltage compensation module 10 to ensure normal operation of the LED load. The first reference voltage changing according to the preset rule can be a first reference voltage with a constant voltage value; or the first reference voltage with gradually increasing voltage value and the like can be realized by different circuits, to which the disclosure does not limit. However, when the line voltage is large, a first reference voltage having compensation information is output by the line voltage compensation module 10 according to the value of the line voltage, for example, when the line voltage is greater than the threshold voltage, the output first reference voltage decreases along with the increase of the line voltage and increases along with the decrease of the line voltage, so that the purpose of compensation is achieved, and the input power can be kept constant under constant-current driving.

Furthermore, the modulation module 20 is particularly used for modulating the first reference voltage according to an externally input PWM signal to output a second reference voltage, so that the duty cycle of the second reference voltage is the same as that of the PWM signal, and the amplitude of the second reference voltage is the same as that of the first reference voltage. That is, the present disclosure receives an externally input PWM signal and a first reference signal output by the line voltage compensation module 10 through the modulation module 20, modulates the first reference voltage according to the PWM signal, and outputs a second reference voltage having both PWM signal characteristics and the first reference voltage characteristics. In particular, the duty cycle of the output second reference voltage is the same as that of the PWM signal, and the amplitude of the second reference voltage is the same as that of the first reference voltage. Normal dimming is not affected, and the input power of the system can be kept constant when the input mains supply voltage fluctuates through the compensated voltage amplitude.

Figure 5:
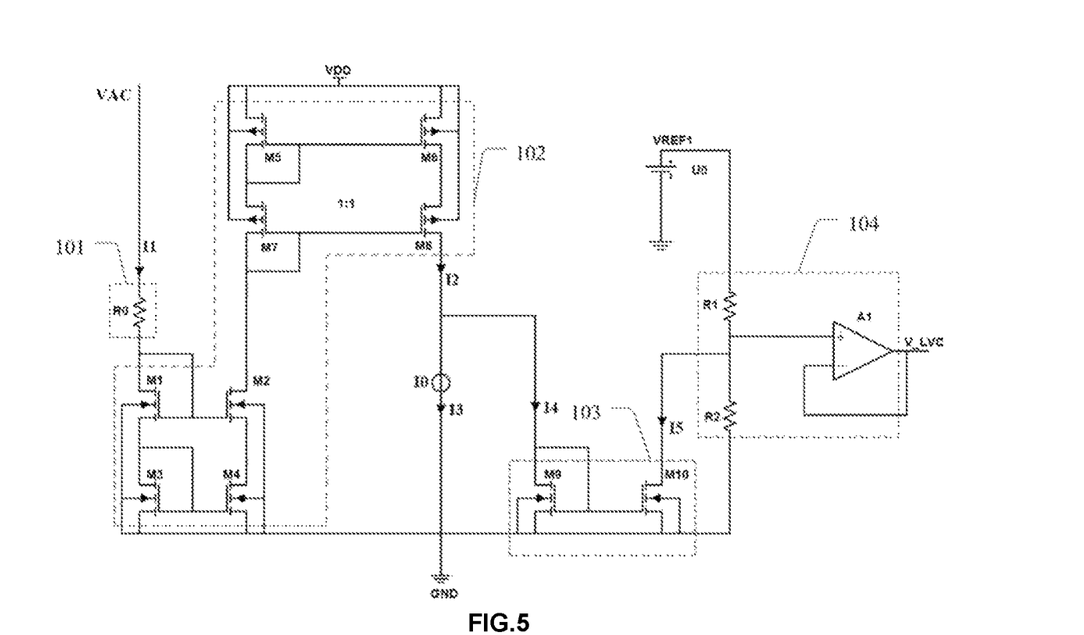
FIG. 5 is a circuit diagram of a line voltage compensation module in a constant-power dimming circuit of an LED driving device according to the present disclosure.

In particular, referring to FIG. 5, the line voltage compensation module 10 comprises a current source I0, a voltage source U0, a conversion unit 101, a first current mirror unit 102, a second current mirror unit 103 and a voltage dividing unit 104, wherein the conversion unit 101 is connected with a line voltage output end VAC and is also connected with the second current mirror unit 103 through the first current mirror unit 102; the second current mirror unit 103 is further connected to a voltage dividing unit 104 which is connected to the voltage source U0 and the modulation module 20.

An input line voltage 101 is converted into a first current through the conversion unit 101 and then output to a first current mirror unit 102 for a first preset multiple mirror image processing to obtain a second current; a fourth current obtained from subtraction carried out on the second current and a third current output by the current source I0 is output to the second current mirror unit 103 for a second preset multiple mirror image processing to obtain a fifth current; and a reference voltage is output from the voltage source U0 to the voltage dividing unit 104; and the magnitude of the first reference voltage output following division of the reference voltage by the voltage dividing unit 104 is controlled according to the fifth current to obtain the first reference voltage having compensation information. According to the disclosure, the voltage signal is converted into a current signal, and then the current signal is subjected to mirror image processing with a preset multiple, so that the value of the output voltage of the voltage dividing unit 104 and the value of the first reference voltage are controlled, the compensation relationship between the first reference voltage and the input line voltage can be flexibly changed according to the preset multiple of the current mirror and specific parameter settings in the voltage dividing module, and the accuracy of compensation output is further improved.

The conversion unit 101 comprises a conversion resistor R0, and the first current mirror unit 102 comprises a first MOS transistor M1, a second MOS transistor M2, a third MOS transistor M3, a fourth MOS transistor M4, a fifth MOS transistor M5, a sixth MOS transistor M6, a seventh MOS transistor M7 and an eighth MOS transistor M8. One end of the conversion resistor R0 is connected with the line voltage output end, and the other end of the conversion resistor R0 is connected with the drain electrode of the first MOS transistor M1, the gate electrode of the first MOS transistor M1 and the gate electrode of the second MOS transistor M2; the source electrode of the first MOS transistor M1 is grounded, and the substrate of the first MOS transistor M1 is connected with the drain electrode of the third MOS transistor M3, the gate electrode of the third MOS transistor M3 and the gate electrode of the fourth MOS transistor M4; the drain electrode of the second MOS transistor M2 is connected with the drain electrode of the seventh MOS transistor M7, the gate electrode of the seventh MOS transistor M7 and the gate electrode of the eighth MOS transistor M8, the source electrode of the second MOS transistor M2 is grounded, and the substrate of the second MOS transistor M2 is connected with the drain electrode of the fourth MOS transistor M4; the source electrode and the substrate of the third MOS transistor M3 are both grounded; the source electrode and the substrate of the fourth MOS transistor M4 are both grounded; the source electrode and the substrate of the fifth MOS transistor M5 are connected with the VDD power supply end, and the gate electrode of the fifth MOS switch is connected with the drain electrode of the fifth MOS transistor M5, the gate electrode of the sixth MOS transistor M6 and the substrate of the seventh MOS transistor M7; the source electrode and the substrate of the sixth MOS transistor M6 are connected with the VDD power supply end, and the drain electrode of the sixth MOS transistor M6 is connected with the substrate of the eighth MOS transistor M8; the source electrode of the seventh MOS transistor M7 is connected with the VDD power supply end; the source electrode of the eighth MOS transistor M8 is connected with the VDD power supply end, the drain electrode of the eighth MOS transistor M8 is connected with one end of the current source I0 and the second current mirror unit 103, and the other end of the current source I0 is grounded.

The second current mirror unit 103 comprises a ninth MOS transistor M9 and a tenth MOS transistor M10, the drain electrode of the ninth MOS transistor M9 is connected with the drain electrode of the eighth MOS transistor M8, the gate electrode of the ninth MOS transistor M9 and the gate electrode of the tenth MOS transistor M10, and the source electrode and the substrate of the ninth MOS transistor M9 are both grounded; the drain electrode of the tenth MOS transistor M10 is connected to the voltage dividing unit 104, and the source electrode and the substrate of the tenth MOS transistor M10 are grounded. In the embodiment, the first MOS transistor M1, the second MOS transistor M2, the third MOS transistor M3, the fourth MOS transistor M4, the ninth MOS transistor M9 and the tenth MOS transistor M10 are N-channel MOS transistors, and the fifth MOS transistor M5, the sixth MOS transistor M6, the seventh MOS transistor M7 and the eighth MOS transistor M8 are P-channel MOS transistors.

The voltage dividing unit 104 comprises a first resistor R1, a second resistor R2 and a first operational amplifier A1. One end of the first resistor R1 is connected with the positive electrode of the voltage source U0, the other end of the first resistor R1 is connected with the drain electrode of the tenth MOS transistor M10, the in-phase input end of the first operational amplifier A1 and got grounded through a second resistor R2; the anti-phase input end of the first operational amplifier A1 is connected to the output of the first operational amplifier A1 and the modulation module 20.

According to the disclosure, the input line voltage VAC is converted and output into a first current I1 through a conversion resistor R0, and the first current I1 is mirrored and output into a second current I2 through a first current mirror unit 102 formed by a first MOS transistor M1, a second MOS transistor M2, a third MOS transistor M3, a fourth MOS transistor M4, a fifth MOS transistor M5, a sixth MOS transistor M6, a seventh MOS transistor M7 and an eighth MOS transistor M8. According to the embodiment, the first preset multiple of the first current mirror unit 102 is M1:1, i.e. I1/I2=M1/1, followed by subtraction of the second current I2 and a third current I3 output by the current source I0 to obtain a fourth current I4 output to the second current mirror unit 103. The fourth current I4 is subjected to mirror image processing of a second preset multiple through the second current mirror unit 103 to output a fifth current to the voltage dividing unit 104, that is, an intermediate point of the first resistor R1 and the second resistor R2, so that the voltage dividing output of the first resistor R1 and the second resistor R2 is changed; a first reference voltage (V_LVC in the embodiment) having compensation information is output, wherein the second preset multiple of the second current mirror unit 103 in the embodiment is 1:M3, i.e. I4/I5=1/M3. In particular, when the line voltage is low, I2 is less than I3, I4 has no current, and the output first reference voltage V_LVC is equal to the voltage division value of the reference voltage VREF1 output by the voltage source U0 through the first resistor R1 and the second resistor R2; when the line voltage is high, I2 is greater than I3, then I4 has current, and the output first reference voltage V_LVC decreases along with the increase of the line voltage and increases along with the decrease of the line voltage. The specific operational formulae are as follows:

$$I_1 = \frac{VAC}{R_0} \quad (1)$$

$$I_4 = I_2 - I_3 = \frac{I_1}{M_1} - I_3 \quad (2)$$

$$I_3 = M_3 \cdot I_4 = M_3 \cdot \left(\frac{I_1}{M_1} - I_3\right) \quad (3)$$

$$V_{LVC} = \frac{R_2}{R_1 + R_2} \cdot VREF_1 - \frac{R_2 \cdot R_1}{R_1 + R_2} \cdot I_5 \quad (4)$$

Figure 6:
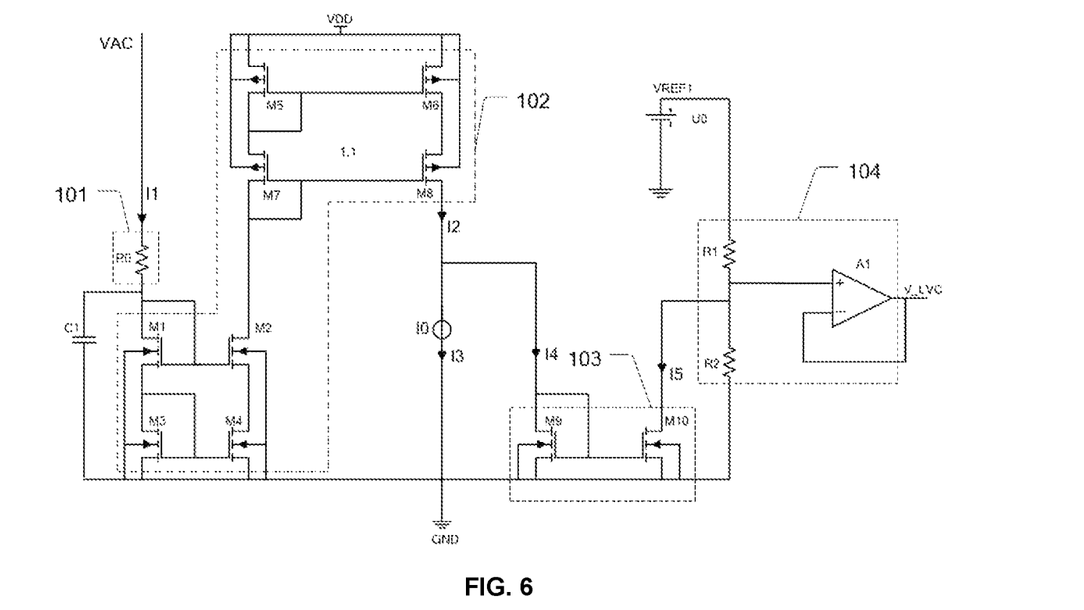
FIG. 6 is a circuit diagram of a preferred embodiment of a line voltage compensation module in a constant-power dimming circuit of an LED driving device according to the present disclosure.

Preferably, in the preferred embodiment of the present disclosure, as shown in FIG. 6, which is a circuit diagram of the line voltage compensation module 10 in a preferred embodiment of the present disclosure. Different from the above-mentioned embodiment, according to the preferred embodiment, a first capacitor C1 for filtering is added to the ground below the conversion resistor R0, one end of the first capacitor C1 is connected with the other end of the conversion resistor R0, the other end of the first capacitor C1 is grounded, and the fluctuation of the first reference voltage V_LVC can be effectively reduced through the filtering effect of the first capacitor C1. Eventually, the fluctuation of the third reference voltage output to the constant current source module 40 can be reduced, thereby reducing the ripple of the constant current source output.

Figure 7:
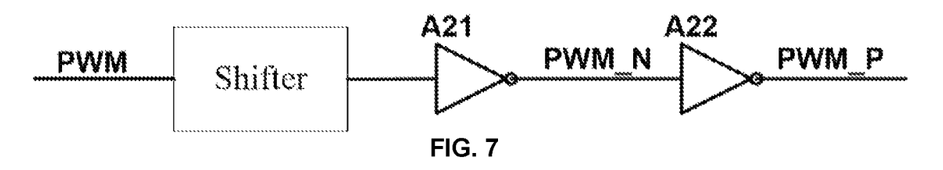
FIG. 7 is a circuit diagram of a signal receiving unit in a constant-power dimming circuit of an LED driving device according to the present disclosure.
Figure 8:
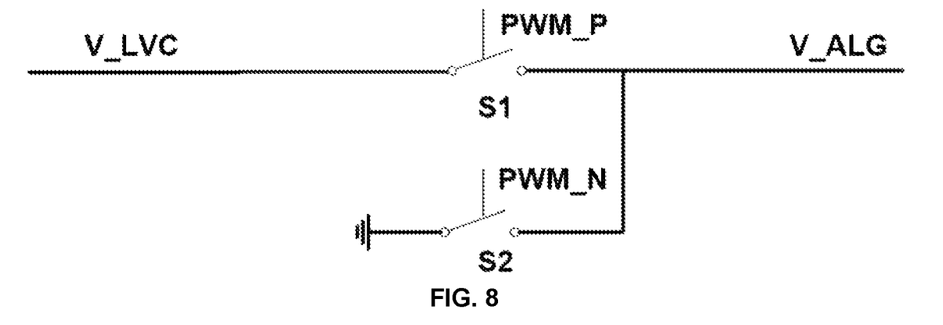
FIG. 8 is a circuit diagram of a modulation unit in a constant-power dimming circuit of an LED driving device according to the present disclosure.

Further, referring to FIGS. 7 and 8, the modulation module 20 includes a signal receiving unit 201 and a modulation unit 202, wherein the signal receiving unit 201 is connected to the modulation unit 202, the modulation unit 202 is also connected to the voltage dividing unit 104 and the filtering module 30, and an externally input PWM signal is received by the signal receiving unit 201 (shown in FIG. 7). The voltage of the externally input PWM signal may not match the supply voltage inside the drive system, the PWM signal is subjected to level shift processing by the signal receiving unit 201 and then output to the modulation unit 202, and the PWM signal subjected to level shift processing and the first reference voltage V_LVC output by the voltage dividing unit 104 are received by the modulation unit 202 to modulate the first reference voltage V_LVC so as to generate a second reference voltage V_ALG having the same duty cycle as that of the PWM signal and the same amplitude signal as that of the first reference voltage V_LVC to the filtering module 30.

In particular, the signal receiving unit 201 comprises a shifter, a first inverter A21 and a second inverter A22, and the modulation unit 202 comprises a first switch S1 and a second switch S2; one end of the shifter is connected with the PWM signal input end, the other end of the shifter is connected with the input end of the first inverter A21, and the output end of the first inverter A21 is connected with the control end of the second switch S2 and the input end of the second inverter A22; the output end of the second inverter A22 is connected with the control end of the first switch S1; two connecting ends of the first switch S1 are respectively connected with the output end of the first operational amplifier A1 and the filter module 30, and two connecting ends of the second switch S2 are respectively connected with the filter module 30 and the ground. After an externally input PWM signal is subjected to level shift by the shifter, an in-phase signal PWM_P and PWM_N are generated by a two-stage inverter and used for driving the first switch S1 and the second switch S2 respectively. The first reference voltage V_LVC is modulated by controlling the first switch S1 and the second switch S2 so as to generate the second reference voltage V_ALG having the same duty cycle as the PWM signal and the same amplitude as the first reference voltage V_LVC, which is output to the constant current source module 40 after subsequent filtering processing so as to control the output current of the constant current source to realize dimming. As such, when the duty cycle of the PWM signal is changed, the input power of the system changes linearly; when the same PWM duty cycle input is kept, and the input mains supply voltage changes, the input power of the system basically keeps unchanged, the phenomenon of voltage flicker is effectively reduced, and the overall lighting effect is improved.

Figure 9:
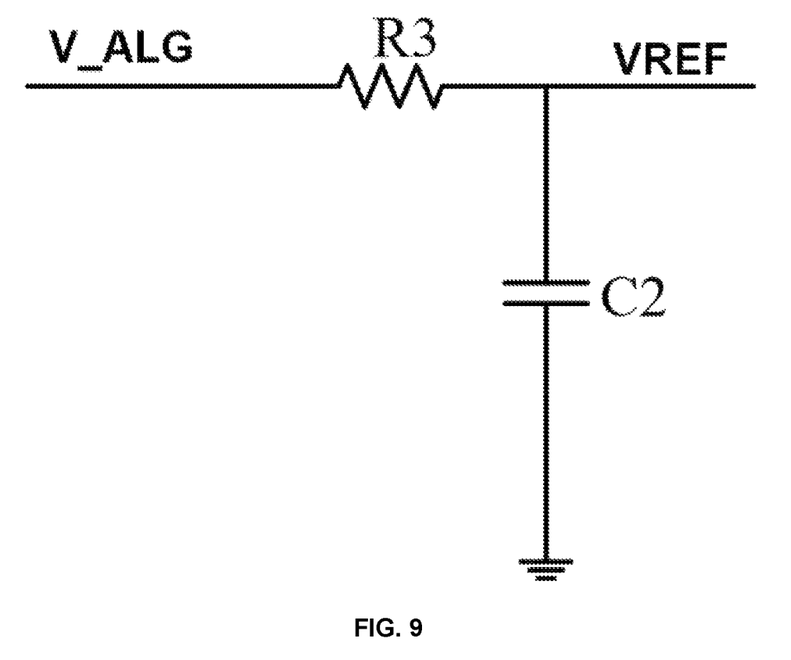
FIG. 9 is a circuit diagram of a filter module in a constant-power dimming circuit of an LED driving device according to the present disclosure.

Further, referring to FIG. 9, the filter module 30 is a first-stage RC Filtering circuit including a third resistor R3 and a second capacitor C2, and the constant current source module 40 includes a second operational amplifier A2 and a high-voltage MOS transistor M0; one end of the third resistor R3 is connected with the connecting ends of the first switch S1 and the second switch S2, the other end of the third resistor R3 is connected with the in-phase input end of the second operational amplifier A2, and is grounded through the second capacitor C2; the anti-phase input end of the second operational amplifier A2 is connected with the source electrode of the high-voltage MOS transistor M0 and is grounded through the sampling resistor Rs. The output end of the second operational amplifier A2 is connected with the gate electrode of the high-voltage MOS transistor M0; the drain electrode of the high-voltage MOS transistor M0 is connected with the negative electrode of the LED lamp string 11 to be dimmed.

Figure 10:
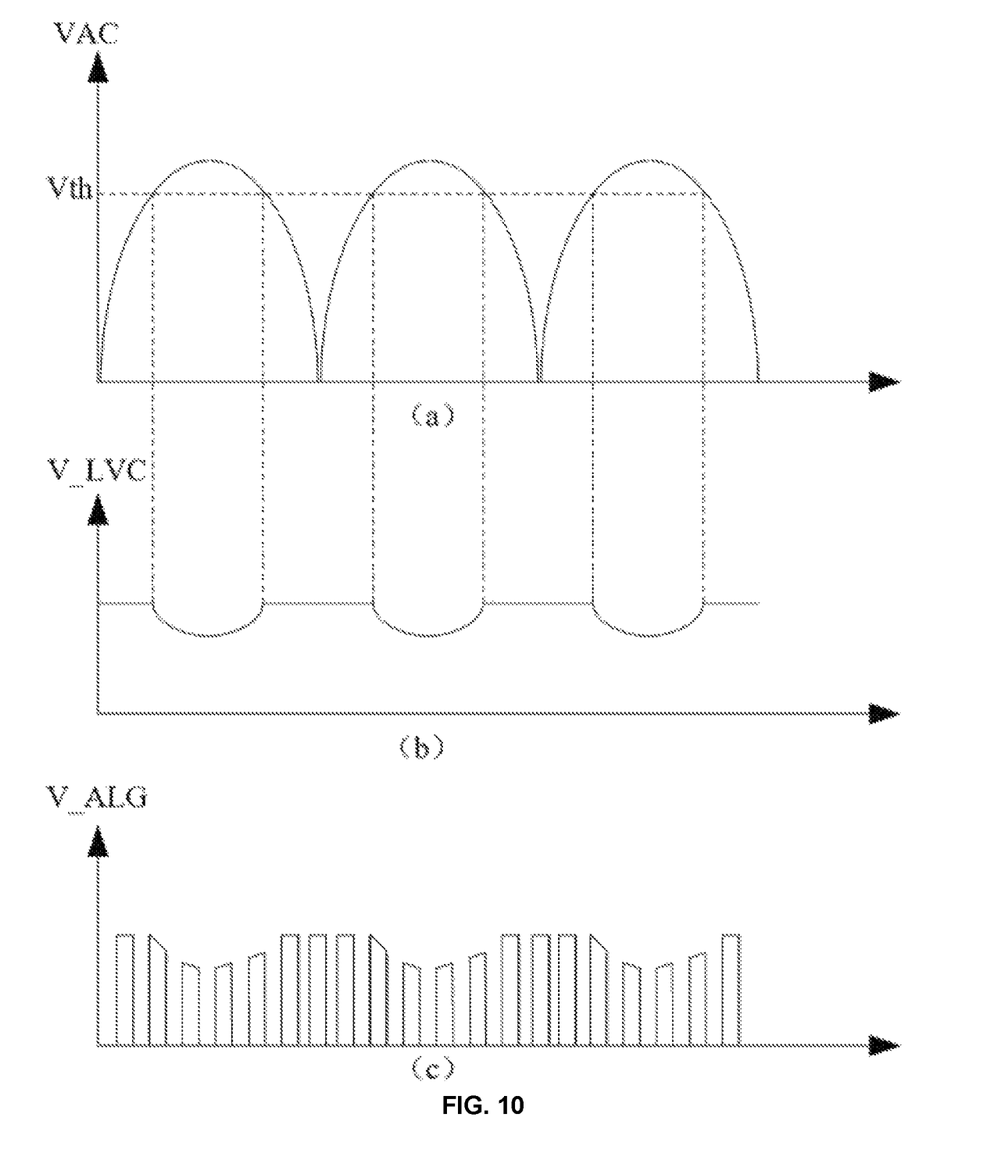
FIG. 10 is a graph showing an input line voltage, a first reference voltage, and a second reference voltage in a constant-power dimming circuit of an LED driving device according to the present disclosure.

The second reference voltage V_ALG is filtered by the first-stage RC filtering circuit formed by a third resistor R3 and a second capacitor C2 to output a third reference voltage VREF, and the direct-current reference voltage signal has the following characteristics that when the input line voltage is unchanged, the third reference voltage VREF changes along with the change of the PWM duty cycle, so that the input power can change linearly with the PWM duty cycle, and the dimming purpose is achieved; when the PWM duty cycle is not changed, the third reference voltage VREF decreases with the increase of the input line voltage, so that the input power is not changed with the input line voltage, the input power is kept constant, and the lighting effect is improved. Specifically, as shown in FIG. 10, (a) in FIG. 10 represents a line voltage, (b) in FIG. 10 represents a first reference voltage V_LVC having compensation information at an output end according to the value of the line voltage, and (c) in FIG. 10 represents a second reference voltage V_ALG output after signal modulation which has both compensation information and PWM duty cycle information. As can be seen from the figure, the first reference voltage is correspondingly compensated according to the magnitude of the input line voltage. In the embodiment, when the line voltage is less than or equal to the threshold voltage Vth, the first reference voltage output is a constant value, and when the line voltage is greater than the threshold voltage Vth, the first reference voltage is no longer a constant value, but decreases with the increase of the line voltage and increases with the decrease of the line voltage, so that the purpose of voltage compensation is achieved, and therefore constant power is achieved in constant current drive. However, the second reference voltage at the output end after modulation not only has the amplitude information of the first reference voltage, but also has the duty cycle information of the PWM signal, in normal dimming operation, the input power is linearly changed with the PWM duty cycle, so that the dimming purpose is achieved.

Figure 11:
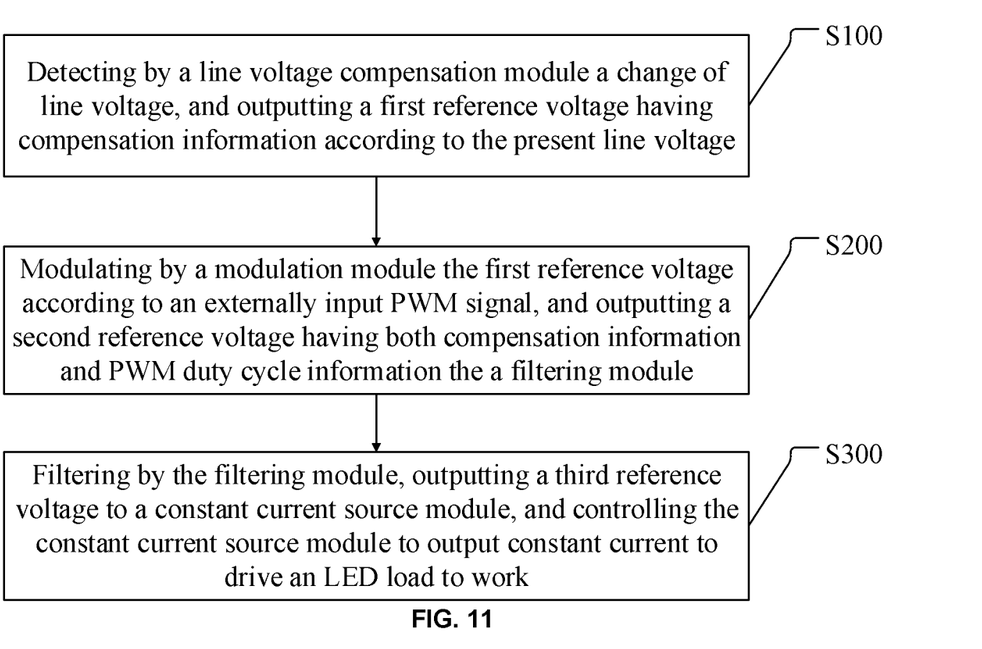
FIG. 11 is a flowchart of a constant-power dimming method of an LED driving device according to the present disclosure.

Correspondingly, the disclosure also provides a constant-power dimming method of the LED driving device, and as shown in FIG. 11, the constant-power dimming method of the LED driving device comprises the following steps of:

S100, Detecting by a line voltage compensation module the change of line voltage, and outputting a first reference voltage having compensation information according to the present line voltage;

S200, Modulating by the modulation module the first reference voltage according to an externally input PWM signal, and outputting a second reference voltage having compensation information and PWM duty cycle information to the filtering module;

S300, Filtering by the filtering module, outputting a third reference voltage to the constant current source module, and controlling the constant current source module to output constant current to drive the LED load to work.

Accordingly, the present disclosure provides a constant-power dimming circuit for an LED driving device, which will not be described in detail since it has been described in detail above.

In summary, according to the LED driving device, the constant-power dimming circuit and the dimming method therefor provided by the disclosure, the constant-power dimming circuit of the LED driving device comprises a line voltage compensation module, a modulation module, a filtering module and a constant current source module; change of the line voltage is detected by the line voltage compensation module, and a first reference voltage having compensation information is output according to the present line voltage; the first reference voltage is modulated by the modulation module according to an externally input PWM signal to output a second reference voltage having compensation information and PWM duty cycle information to the filtering module; a third reference voltage is output to the constant current source module after the second reference voltage is filtered by the filtering module, and the constant current source module is controlled to output constant current to drive the LED load to work. The constant-current source circuit is controlled by outputting voltage with line voltage compensation information and PWM signal duty cycle information at the same time, so that when the duty cycle of the PWM signal is unchanged and the input mains supply voltage is changed, the input power of the system is kept constant, and voltage flicker is reduced.

It will be understood by those skilled in the art that equivalent alterations and modifications may be made in accordance with the teachings of this disclosure and its inventive concepts, and all such alterations and modifications are intended to fall within the scope of the appended claims.

What is claimed is:

1. A constant-power dimming circuit of an LED driving device, wherein comprising a line voltage compensation module, a modulation module, a filtering module and a constant current source module, a change of a line voltage is detected by the line voltage compensation module, and a first reference voltage having, compensation information is output according to a present line voltage; the first reference voltage is modulated by the modulation module according to an externally input PWM signal to output a second reference voltage having compensation information and PWM duty cycle information to the filtering module; a third reference voltage is output to the constant current source module after the second reference voltage is filtered by the filtering module, and the constant current source module is controlled to output a constant current to drive an LED load to work.

2. The constant-power dimming circuit of the LED driving device according to claim 1, wherein the line voltage compensation module is particularly used for outputting the first reference voltage changing according to a preset rule when the present line voltage is less than or equal to a threshold voltage; and outputting the first reference voltage having compensation information according to a value of the line voltage when the present line voltage is greater than the threshold voltage.

3. The constant-power dimming circuit of the LED driving device according to claim 1, wherein the modulation module is particularly used for modulating the first, reference voltage according to the externally input PWM signal to output the second reference voltage, so that a duty cycle of the second reference voltage is the same as that of the PWM signal, and an amplitude of the second reference voltage is the same as that of the first reference voltage.

4. The constant-power dimming circuit of the LED driving device according to claim 1, wherein the line voltage compensation module comprises a current source, a voltage source, a conversion unit, a first current mirror unit, a second current mirror unit and a voltage dividing unit, an input line voltage is converted into a first current through the conversion unit and then output to the first, current mirror unit for a first preset multiple mirror image processing to obtain a second current; a fourth current obtained from subtraction carried out on the second current and a third current output by the current source is output to the second current mirror unit for a second preset multiple mirror image processing to obtain a fifth current; and a reference voltage is output from the voltage source to the voltage dividing unit; and a magnitude of the first reference voltage output following a division of the reference voltage by the voltage dividing unit is controlled according to the fifth current to obtain the first reference voltage having compensation information.

5. The constant-power dimming circuit of the LED driving device according to claim 1, wherein the modulation module comprises a signal receiving unit and a modulation unit, the externally input PWM signal is received by the signal receiving unit, followed by level shift processing, and then output to the modulation unit; the first reference voltage is modulated by the modulation unit according to the PWM signal processed through level shift to output the second reference voltage, so that a duty cycle of the second reference voltage is the same as that of the PWM signal, and an amplitude of the second reference voltage is the same as that of the first reference voltage.

6. The constant-power dimming circuit of the LED driving device according to claim 4, wherein the conversion unit comprises a conversion resistor, the first current mirror unit comprises a first MOS transistor, a second MOS transistor, a third MOS transistor, a fourth MOS transistor, a fifth MOS transistor, a sixth MOS transistor, a seventh MOS transistor and an eighth MOS transistor; one end of the conversion resistor is connected with a line voltage output end, and the other end of the conversion resistor is connected with a drain electrode of the first MOS transistor, a gate electrode of the first MOS transistor and a gate electrode of the second MOS transistor; a source electrode of the first MOS transistor is grounded, and a substrate of the first MOS transistor is connected with a drain electrode of the third MOS transistor, a gate electrode of the third MOS transistor and a gate electrode of the fourth MOS transistor; a drain electrode of the second MOS transistor is connected with a drain electrode of the seventh MOS transistor, a gate electrode of the seventh MOS transistor and a gate electrode of the eighth MOS transistor; a source electrode of the second MOS transistor is grounded, and a substrate of the second MOS transistor is connected with a drain electrode of the fourth MOS transistor; a source electrode and a substrate of the third MOS transistor are both grounded; a source electrode and a substrate of the fourth MOS transistor are both grounded, a source electrode and a substrate of the fifth MOS transistor are connected with a VDD power supply end, and a gate electrode of the fifth MOS transistor is connected with a drain electrode of the fifth MOS transistor, a gate electrode of the sixth MOS transistor and a substrate of the seventh MOS transistor; a source electrode and a substrate of the sixth MOS transistor are connected with the VDD power supply end, and a drain electrode of the sixth MOS transistor is connected with a substrate of the eighth MOS transistor, a source electrode of the seventh MOS transistor is connected with the VDD power supply end, a source electrode of the eighth MOS transistor is connected with the VDD power supply end, a drain electrode of the eighth MOS transistor is connected with one end of the current source and the second current mirror unit, and the other end of the current source is grounded.

7. The constant-power dimming circuit of the LED driving device according to claim 6, wherein the second current mirror unit comprises a ninth MOS transistor and a tenth MOS transistor, wherein a drain electrode of the ninth MOS transistor is connected with the drain electrode of the eighth MOS transistor, a gate electrode of the ninth MOS transistor and a gate electrode of the tenth MOS transistor, and a source electrode and a substrate of the ninth MOS transistor are grounded; a drain electrode of the tenth MOS transistor is connected with the voltage dividing unit, and a source electrode and a substrate of the tenth MOS transistor are both grounded.

8. The constant-power dimming circuit of the LED driving device according to claim 7, wherein the voltage dividing unit comprises a first resistor, a second resistor and a first operational amplifier, one end of the first resistor is connected with a positive electrode of the voltage source, the other end of the first resistor is connected with the drain electrode of the tenth MOS transistor, an in-phase input end of the first operational amplifier and get grounded through the second resistor; an anti-phase input end of the first operational amplifier is connected with an output end of the first operational amplifier and the modulation module.

9. A constant-power dimming method of an LED driving device, wherein comprising the following steps of:
   A. Detecting by a line voltage compensation module a change of line voltage, and outputting a first reference voltage having compensation information according to a present line voltage;
   B. Modulating by a modulation module the first reference voltage according to an externally input PWM signal to output a second reference voltage having compensation information and PWM duty cycle information to a filtering module; and
   C. Filtering by the filtering module, outputting a third reference voltage to a constant current source module, and controlling the constant current source module to output constant current to drive an LED load to work.

10. An LED driving device, comprising an LED lamp string, a rectifying module used for rectifying an input alternating current, and a sampling resistor for sampling a current of the LED lamp string, wherein the LED driving device further comprising a constant power dimming circuit according to claim 1, wherein an input end of the rectifying module is connected with alternating current, an output end of the rectifying module is connected with the constant-power dimming circuit and the LED lamp string, and the constant-power dimming circuit is grounded through the sampling resistor.

* * * * *